July 24, 1923.
H. S. ALTMAN
HANDLE FOR PIE PANS
Filed March 24, 1923
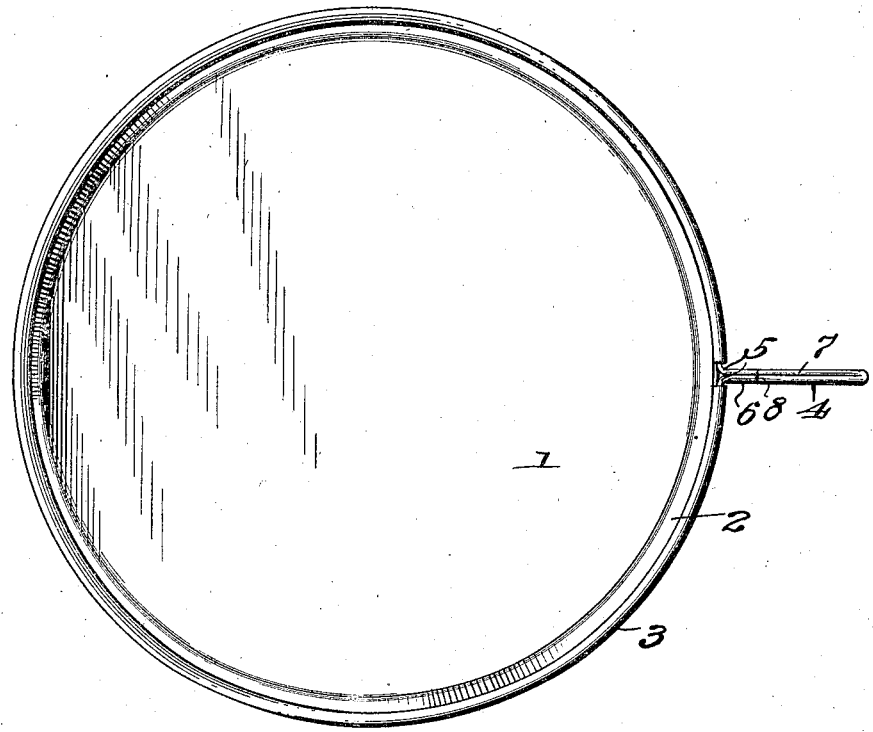
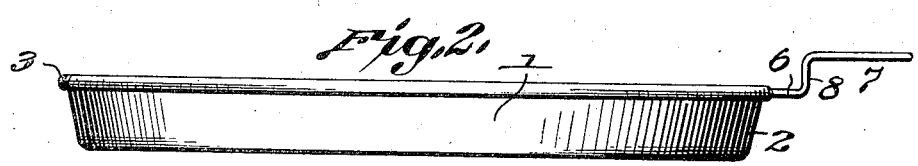
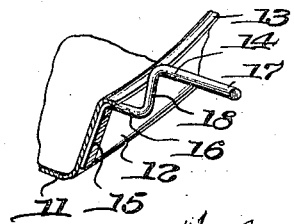
Inventor
Helen Sophia Altman Patented July 24, 1923.

1,462,880

UNITED STATES PATENT OFFICE.

HELEN SOPHIA ALTMAN, OF ELCHO, WISCONSIN.

HANDLE FOR PIE PANS.

Application filed March 24, 1923. Serial No. 627,525.

*To all whom it may concern:*

Be it known that I, HELEN SOPHIA ALTMAN, a citizen of the United States of America, residing at Elcho, in the county of Langlade and State of Wisconsin, have invented certain new and useful Improvements in Handles for Pie Pans, of which the following is a specification, reference being had to the drawing forming a part thereof.

The invention relates to improvements in handles for pie pans, and has for its object, the provision of a simple, convenient, easily manufactured and inexpensive wire handle, which is so constructed that it does not interfere with the proper placing of the pie crusts in the plate.

It has for a further object, the provision of a handle which is so constructed as to permit the free use of the same, even when several pans are in the oven, one in front of another.

The preferred form of my invention is illustrated in the accompanying drawing in which the characters of reference refer to similar parts throughout the several figures; and in which—

Figure 1 is a plan view of a pan with the preferred form of my invention thereon, Figure 2 is a side elevation of the same, and Figure 3 is a fragmentary view in perspective, of a pan embodying a slightly modified form of my invention adapted for use on pans not having wire reinforcements in the beads thereof.

In the drawing, 1 designates generally a pie-pan, having upturned side walls 2, provided with a bead formed with a wire reinforcing member, a loop of which is turned outwardly as at 5 and doubled against itself to form the handle 4. The handle is preferably formed with a substantially horizontal portion 6, about one-half inch in length, which will be sufficient to avoid inconvenience to the cook in placing the crust in the pan. The handle has also an upturned portion 8, of about one inch in length, and a substantially horizontal grip portion 7, which I prefer to make about three inches long.

With reference to Figure 3, wherein is shown a modified form of my invention, 11 designates generally a pie-pan, having an upturned, outwardly flared side wall 12, with an outturned flange 13 at the top thereof. The handle 14 in this instance is provided with a slightly flattened portion 15 adapted to be brazed, riveted or otherwise fastened to the side wall 12. The portions 16, 17 and 18 are of the same proportions and perform the same functions as those designated 6, 7, and 8, respectively, in Figs. 1 and 2.

I claim:

A pie pan having its peripheral wall provided with a bead at its upper edge, a handle formed of a doubled strand of wire having its inner ends turned into the bead, said handle bent upwardly at a distance from the bead and also bent outwardly a distance from the top of the pan edge.

In testimony whereof I affix my signature in the presence of two witnesses.

HELEN SOPHIA ALTMAN. [L. S.]

Witnesses:
 Mrs. L. S. PARKER,
 GEO. H. BAUER.